2 Sheets—Sheet 2.

W. E. DAVIS.
Railway Ticket.

No. 200,264.      Patented Feb. 12, 1878.

*Fig. 3.*

*Fig. 4.*

Attest:
H. Benjamin
Edw. A. Welsh

Inventor
W. E. Davis
By his Atty
Charles E. Foster

UNITED STATES PATENT OFFICE.

WILLIAM E. DAVIS, OF PORT HURON, MICHIGAN.

IMPROVEMENT IN RAILWAY-TICKETS.

Specification forming part of Letters Patent No. 200,264, dated February 12, 1878; application filed December 3, 1877.

*To all whom it may concern:*

Be it known that I, WILLIAM E. DAVIS, of Port Huron, St. Clair county, Michigan, have invented an Improved Railway - Ticket, of which the following is a specification:

The object of my invention is to avoid the difficulties incident to the prevailing modes of issuing tickets to points on roads extending from the main lines represented by the issuing-office.

In the drawings, Figure 1 is a face view of the improved ticket; Fig. 2, a rear view; Fig. 3, a view illustrating the use of the ticket, and Fig. 4 a view showing a ticket of the ordinary form.

Before describing my improvement, I will refer to certain facts.

Every issue-office represents certain lines of its own or leased roads, which I term "main lines," and issues tickets to any points thereon. It also issues through coupon-tickets, which transfer a passenger from a certain station on such main lines to the terminal or to a main station of an intersecting branch or connecting road.

Such through coupon-tickets, however, cannot be limited to intermediate stations on such intersecting roads. The traveler must take the ticket for the entire route, or else take a ticket to the station on the main line, and there buy a local ticket to the desired point. This results from the impracticability of permitting the selling-agent to tear off coupons from the through coupon-ticket over another line. To avoid this but two plans have been adopted.

First. To place on sale in the issue-office through coupon - tickets to all the various points on such connecting roads. This is expensive, and require the selling-agent having tickets over many routes to maintain a great number of separate tickets to each and every place to which tickets may be desired, and a separate form for each route, leading to expense, difficulty, and delay in making up reports and adjustments, and rendering it extremely troublesome and expensive to give a new road a representation or place in the selling-office, or to change the representation of an old road. For instance, suppose travelers in Chicago desire to go to Port Huron *via* Chicago and Lake Huron Railroad, and thence to various different points on the Grand Trunk Railroad between Port Huron and Riviere du Loup. Under the above-described arrangement the Chicago agent must have forty-one different sets of tickets covering the various points *via* Chicago, Port Huron, and Riviere du Loup. Each form or issue of tickets costs about $1.25, total $51.25, which is increased with every additional route or form.

Second. The other plan is to furnish an extension-ticket, T, Fig. 4, in blank, on which the name of the final station of the extended route is written.

This plan, after long trial, has proved very objectionable for the following reasons:

First. The general issuing-office can have no positive check on the selling-agent, who, by accident or design, may fill out the blank coupon to a place on the route beyond that entered on his stub. Even if merely accidental, (and such accidents are of frequent occurrence,) it leads to the greatest difficulty and confusion in accounts and settlements between roads.

Second. Purchasers of such tickets can increase the value by alterations.

Third. Selling - agents are frequently not thoroughly informed as to the names of stations on extension-routes, or as to the routes to such stations, and make mistakes, issuing the wrong forms or writing the wrong names, thereby subjecting passengers to detention and loss, for which the issuing company is held responsible, while great confusion in accounts results.

My invention is a ticket of a new construction, which, by actual test, has effectually overcome the objections above stated.

The improved ticket consists, essentially, of four parts, to wit: first, the coupon or coupons A between the issue-office and the terminal station on the main road; second, the ticket-body or "contract" portion B; third, the extension-coupon C, having printed thereon a successive list of stations on the extension-road, separated by spaces, lines, or perforations; fourth, the agent's stub D; fifth, a printed list of stations, E, on the back. This, however, is only a supplemental feature.

The first section, A, is of the usual character.

C. F. DINKLE & C. R. WOODWARD.
Dumping-Wagon.
No. 200,265.   Patented Feb. 12, 1878.
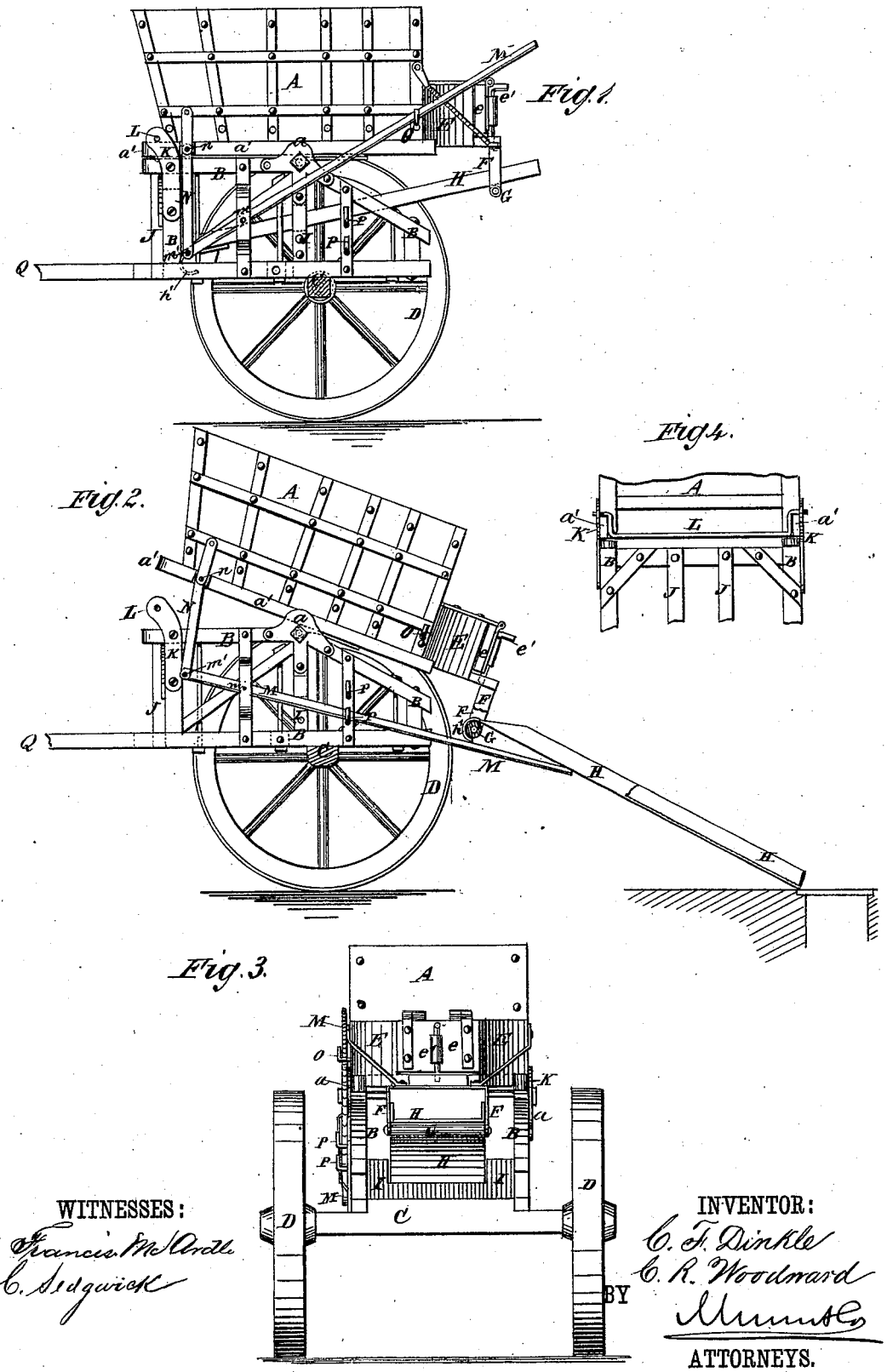
WITNESSES:
Francis McArdle
C. Sedgwick
INVENTOR:
C. F. Dinkle
C. R. Woodward
BY
ATTORNEYS.